US011262234B2

(12) United States Patent
Kang et al.

(10) Patent No.: US 11,262,234 B2
(45) Date of Patent: Mar. 1, 2022

(54) DIRECTIONAL ACOUSTIC SENSOR AND METHOD OF DETECTING DISTANCE FROM SOUND SOURCE USING THE DIRECTIONAL ACOUSTIC SENSOR

(71) Applicant: SAMSUNG ELECTRONICS CO., LTD., Suwon-si (KR)

(72) Inventors: Sungchan Kang, Hwaseong-si (KR); Hyunwook Kang, Hwaseong-si (KR); Yongseop Yoon, Seoul (KR); Jaehyung Jang, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 16/574,916

(22) Filed: Sep. 18, 2019

(65) Prior Publication Data
US 2020/0370951 A1    Nov. 26, 2020

(30) Foreign Application Priority Data
May 20, 2019    (KR) .................. 10-2019-0059131

(51) Int. Cl.
*G01H 11/06*    (2006.01)
*G01H 13/00*    (2006.01)
*H04S 7/00*    (2006.01)
*G01H 7/00*    (2006.01)
(Continued)

(52) U.S. Cl.
CPC .............. *G01H 11/06* (2013.01); *G01H 7/00* (2013.01); *G01H 13/00* (2013.01); *G01S 3/801* (2013.01); *H04S 7/301* (2013.01); *H04R 1/32* (2013.01)

(58) Field of Classification Search
CPC ........ G01H 11/06; G01H 13/00; G01H 15/00; G01H 7/00; G01S 3/801; H04R 1/32; H04R 29/00; H04S 7/301
See application file for complete search history.

(56) References Cited

U.S. PATENT DOCUMENTS

| | | | | | |
|---|---|---|---|---|---|
| 4,965,775 A | * | 10/1990 | Elko | ...................... | H04R 1/406 367/119 |
| 6,651,504 B1 | * | 11/2003 | Datskos | ................... | G01H 3/06 367/103 |
| 9,319,787 B1 | | 4/2016 | Chu | | |

(Continued)

FOREIGN PATENT DOCUMENTS

JP    2014-98568 A    5/2014

OTHER PUBLICATIONS

Monaural Sound Localization Based on Reflective Structure and Homomorphic Deconvolution, Park et al., Sensors 2017, 17, 2189; doi:10.3390/s17102189 (Year: 2017).*

(Continued)

*Primary Examiner* — David L Singer
(74) *Attorney, Agent, or Firm* — Sughrue Mion, PLLC

(57) ABSTRACT

A directional acoustic sensor may include a plurality of resonators arranged in different directions; and a processor configured to calculate a time difference between a first signal that is received by the plurality of resonators directly from a sound source (e.g., a speaker) and a second signal that is received by the plurality of resonators from the sound source after being reflected on a wall surface around the sound source, and determine a distance between the sound source and the directional acoustic sensor based on the time difference.

18 Claims, 13 Drawing Sheets

(51) Int. Cl.
*G01S 3/801* (2006.01)
*H04R 1/32* (2006.01)

(56) References Cited

U.S. PATENT DOCUMENTS

| | | | |
|---|---|---|---|
| 9,843,858 B1 | 12/2017 | Karunasiri et al. | |
| 10,404,847 B1* | 9/2019 | Unger | G10L 21/0364 |
| 10,598,543 B1* | 3/2020 | Mansour | H04R 3/005 |
| 10,777,214 B1* | 9/2020 | Shi | G10L 21/02 |
| 10,959,018 B1* | 3/2021 | Shi | G06N 20/00 |
| 2002/0164037 A1 | 11/2002 | Sekine | |
| 2006/0153391 A1* | 7/2006 | Hooley | H04S 7/301 |
| | | | 381/17 |
| 2008/0144864 A1* | 6/2008 | Huon | H04R 3/005 |
| | | | 381/305 |
| 2009/0086577 A1 | 4/2009 | Ledeczi et al. | |
| 2012/0014551 A1* | 1/2012 | Ohashi | G10K 11/20 |
| | | | 381/333 |
| 2012/0020189 A1* | 1/2012 | Agevik | G01H 7/00 |
| | | | 367/127 |
| 2012/0097636 A1* | 4/2012 | Bachman | H04R 19/005 |
| | | | 216/20 |
| 2013/0064042 A1* | 3/2013 | Aarts | H04R 3/12 |
| | | | 367/99 |
| 2013/0336093 A1* | 12/2013 | Suvanto | G01S 7/521 |
| | | | 367/99 |
| 2016/0050506 A1* | 2/2016 | Kim | H04R 17/025 |
| | | | 381/56 |
| 2017/0006385 A1* | 1/2017 | Kim | H04R 1/245 |
| 2017/0098441 A1* | 4/2017 | Economou | G01H 3/00 |
| 2018/0038901 A1* | 2/2018 | Kim | G01H 3/08 |
| 2018/0061398 A1 | 3/2018 | Gomez et al. | |
| 2018/0097506 A1* | 4/2018 | Kang | H03H 9/54 |
| 2018/0115855 A1* | 4/2018 | Bakish | H04S 3/008 |
| 2018/0130485 A1* | 5/2018 | Park | G10L 25/21 |
| 2018/0131347 A1* | 5/2018 | Rhee | H01L 41/1132 |
| 2019/0072635 A1 | 3/2019 | Kang et al. | |
| 2019/0306649 A1* | 10/2019 | Giron | G01S 15/89 |
| 2020/0068302 A1 | 2/2020 | Kang et al. | |
| 2020/0228896 A1* | 7/2020 | Chesney | G10L 15/22 |

OTHER PUBLICATIONS

"Audio Trends: Room Acoustics—An Overview", Retrieved on Jul. 25, 2019, https://www.audiotrends.com.au/room-acoustics-overview, 6 pages total.

Prophet, G., "Voice Recognition by sensor fusion; radar plus MEMS microphones", Mar. 1, 2017, Retrieved from https://www.eenewsautomotive.com/news/voice-recognition-sensor-fusion-radar-plus-mems-microphones, 3 pages total.

Esaki, S., et al., "Sound Source Distance Estimation Using a Small-size Microphone Array", Apr. 1, 2012, The Journal of the Acoustical Society of America, 1 page total.

* cited by examiner $d_2 = 0.7m$ $d_2 = 0.85m$ $d_2 = 1m$ $d_2 = 1.15m$ $d_2 = 1.3m$ $d_2 = 1.45m$ $d_2 = 0.7m$ $d_2 = 0.85m$ $d_2 = 1m$ $d_2 = 1.15m$ $d_2 = 1.3m$

DIRECTIONAL ACOUSTIC SENSOR AND METHOD OF DETECTING DISTANCE FROM SOUND SOURCE USING THE DIRECTIONAL ACOUSTIC SENSOR

CROSS-REFERENCE TO RELATED APPLICATION

This application claims priority from Korean Patent Application No. 10-2019-0059131, filed on May 20, 2019, in the Korean Intellectual Property Office, the disclosure of which is incorporated herein by reference in its entirety.

BACKGROUND

1. Field

Apparatuses and methods consistent with example embodiments relate to directional acoustic sensors, and more particularly, to directional acoustic sensors and methods of detecting a distance from a sound source using the same.

2. Description of the Related Art

The application of acoustic sensors, which are installed in home electric appliances, image display devices, virtual reality devices, augmented reality devices, and artificial intelligent speakers detect a direction from which sound comes and recognize speech, increases. Recently, a directional acoustic sensor that converts a mechanical motion caused by a pressure difference into an electrical signal and detects an acoustic signal has been developed.

SUMMARY

Provided are directional acoustic sensors and methods of detecting a distance from a sound source using the same.

According to an aspect of an example embodiment, there is provided a directional acoustic sensor including: a plurality of resonators arranged in different directions; and a processor configured to calculate a time difference between a first signal that is received by the plurality of resonators directly from a sound source and a second signal that is received by the plurality of resonators from the sound source after being reflected on a wall surface around the sound source, and determine a distance between the sound source and the directional acoustic sensor based on the time difference.

The plurality of resonators may include a first resonator configured to receive the first signal and a second resonance unit configured to receive the second signal.

The processor may be further configured to calculate the distance between the sound source and the directional acoustic sensor by using an equation below, $$d_1 = \frac{2 \cdot d_2^2}{\Delta t \cdot v} - \frac{\Delta t \cdot v}{2}$$

wherein $d_1$ denotes the distance between the sound source and the directional acoustic sensor, $d_2$ denotes a distance between the sound source and the wall surface, and $\Delta t$ denotes the time difference between the first signal and the second signal, and v denotes a speed of sound.

The processor may be further configured to determine the distance between the sound source and the wall surface based on a time taken for a sound generated by the directional acoustic sensor to be reflected from the wall surface and return to the directional acoustic sensor.

The processor may be further configured to determine the time difference between the first signal and the second signal based on a difference between a time taken for the first signal to reach the first resonator and a time taken for the second signal to reach the second resonator.

The plurality of resonators may include a plurality of substrates each having a cavity penetrating therethrough; and at least one cantilever beam is provided on each of the plurality of substrates.

The plurality of substrates may be arranged in different directions.

The at least one cantilever beam may include a plurality of cantilever beams arranged in parallel with one another or a plurality of cantilever beams arranged radially.

According to an aspect of another example embodiment, there is provided a method of detecting a distance between a sound source and a directional acoustic sensor using the directional acoustic sensor comprising a plurality of resonators arranged in different directions, the method including: determining a time difference between a first signal that is received by the plurality of resonators directly from the sound source and a second signal that is received by the plurality of resonators from the sound source after being reflected on a wall surface around the sound source, and determining the distance between the sound source and the directional acoustic sensor based on the time difference.

The plurality of resonators may include a first resonator configured to receive the first signal and a second resonator configured to receive the second signal.

The determining the distance between the sound source and the directional acoustic sensor comprises determining the distance between the sound source and the directional acoustic sensor using an equation below, $$d_1 = \frac{2 \cdot d_2^2}{\Delta t \cdot v} - \frac{\Delta t \cdot v}{2}$$

wherein $d_1$ denotes the distance between the sound source and the directional acoustic sensor, $d_2$ denotes a distance between the sound source and the wall surface, $\Delta t$ denotes the time difference between the first signal and the second signal, and v denotes a speed of sound.

The determining the distance between the sound source and the directional acoustic sensor may further include: calculating the distance between the sound source and the wall surface by measuring a time taken for a sound generated by the directional acoustic sensor to be reflected from the wall surface and return to the directional acoustic sensor.

The determining the distance between the sound source and the directional acoustic sensor may further include: calculating the time difference between the first signal and the second signal is by measuring a difference between a time taken for the first signal to reach the first resonator and a time taken for the second signal to reach the second resonator.

The plurality of resonators may include a plurality of substrates each having a cavity penetrating therethrough; and at least one cantilever beam may be provided on each of the plurality of substrates.

The plurality of substrates may be arranged in different directions.

The at least one cantilever beam may include a plurality of cantilever beams arranged in parallel with one another or a plurality of cantilever beams arranged radially.

According to an aspect of another example embodiment, there is provided a non-transitory computer-readable storage medium storing a program that is executable by a computer to perform a method of detecting a distance between a speaker and an acoustic sensor, the method including: determining a time difference between a first acoustic signal that travels in a direct path from the speaker to the acoustic sensor and a second acoustic signal that travels in an indirect path from the speaker to the acoustic sensor via a sound reflection surface; determining the distance between the speaker and the acoustic sensor based on the time difference; and executing a voice command that is output from the speaker based on the distance between the speaker and the acoustic sensor.

The method may further include retrieving from a memory, information of a distance between the acoustic sensor and the sound reflection surface. The determining the time difference may include determining the time difference between the first acoustic signal and the second acoustic signal further based on the retrieved information.

The method may further include causing a third acoustic signal to be emitted from the acoustic sensor toward the sound reflection surface and then collected by the acoustic sensor, and determining a distance between the acoustic sensor and the sound reflection surface based on the third acoustic signal collected by the acoustic sensor. The determining the distance between the speaker and the acoustic sensor may include determining the distance between the speaker and the acoustic sensor further based on the distance between the acoustic sensor and the sound reflection surface.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
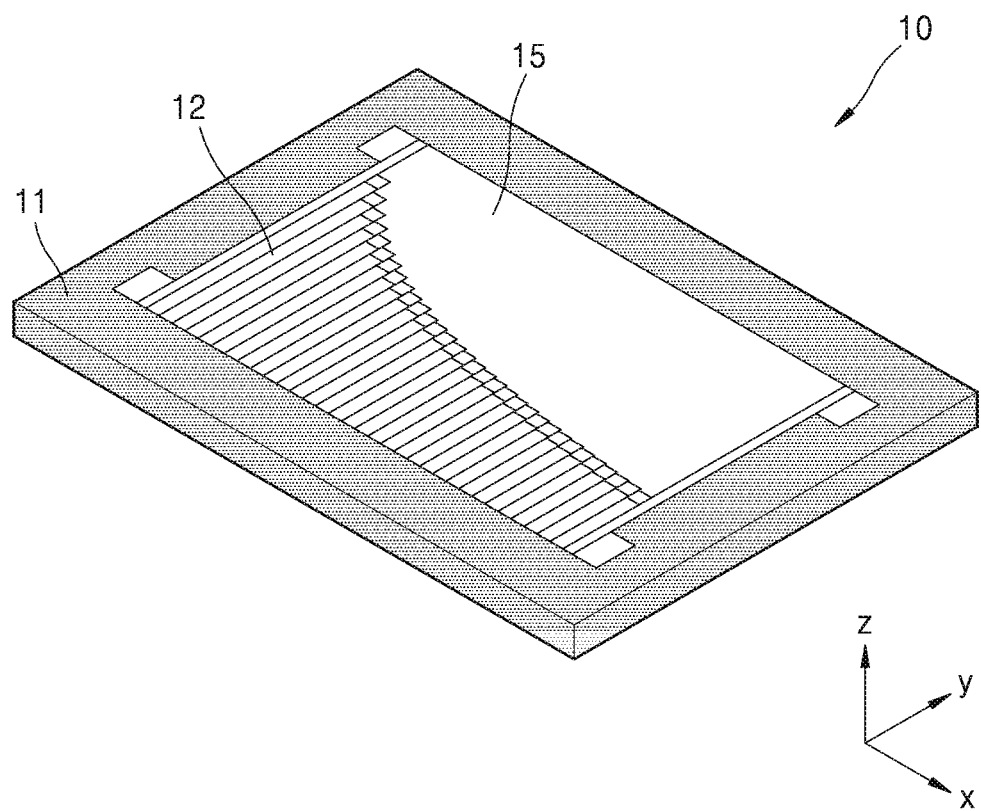
FIG. 1 illustrates an example of a directional acoustic sensor.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Reference will now be made in detail to embodiments, examples of which are illustrated in the accompanying drawings, wherein like reference numerals refer to like elements throughout. The thickness or size of each layer illustrated in the drawings may be exaggerated for convenience of explanation and clarity. In this regard, the present embodiments may have different forms and should not be construed as being limited to the descriptions set forth herein.

Hereinafter, when a constituent element is disposed "above" or "on" to another constituent element, the constituent element may be only directly on the other constituent element or above the other constituent elements in a non-contact manner. The expression of singularity in the present specification includes the expression of plurality unless clearly specified otherwise in context. Also, terms such as "comprise" and/or "comprising" may be construed to denote a constituent element, but may not be construed to exclude the existence of or a possibility of addition of another constituent element.

The use of the terms "a" and "an" and "the" and similar referents in the context of describing the disclosure (especially in the context of the following claims) are to be construed to cover both the singular and the plural. Also, operations of all methods described herein may be performed in any suitable order unless otherwise indicated herein or otherwise clearly contradicted by context. The present disclosure is not limited to the described order of the operations. The use of any and all examples, or language (e.g., "such as") provided herein, is intended merely to better illuminate the disclosure and does not pose a limitation on the scope of the disclosure unless otherwise claimed.

Figure 2:
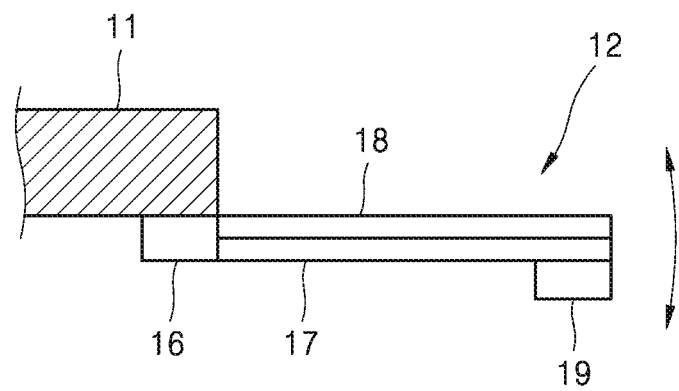
FIG. 2 illustrates a cross-section of a resonator shown in FIG. 1.

FIG. 1 illustrates an example of a directional acoustic sensor 10. FIG. 2 illustrates a cross-section of one of resonators 12 shown in FIG. 1.

Referring to FIGS. 1 and 2, the directional acoustic sensor 10 may include a substrate 11 and resonators 12. The substrate 11 may be formed with a cavity 15 penetrating therethrough. The substrate 11 may include, for example, a silicon substrate, but the substrate 11 is not limited thereto.

The plurality of resonators 12 may be arranged on the cavity 115 of the substrate 11 in a predetermined form. The resonators 12 may be arranged in a planar manner without overlapping each other. For example, the resonators 12 may be arranged in parallel with each other. Each of the resonators 12 may have one end fixed to the substrate 11 as shown in FIG. 2 and may be provided to extend toward the cavity 15. Each of the resonators 12 may include a fixing unit 16 fixed to the substrate 11, a moving unit 18 moving or vibrating in response to an input acoustic signal, and a sensing unit (e.g., a sensor) 17 sensing a movement of the moving unit 18. In addition, the resonator 12 may further include a mass body 19 for providing a predetermined mass to the moving unit 18.

The resonators 12 may be provided, for example, to sense acoustic frequencies of different bands. That is, the resonators 12 may be provided to have different center frequencies. To this end, the resonators 12 may be provided with different dimensions. For example, the resonators 12 may be provided to have different lengths, widths, or thicknesses.

The moving unit 18 may be also referred to as a cantilever beam, or a cantilever arm. The moving unit 18 may be anchored at one end only while the other end may be free and unsupported.

Figure 3:
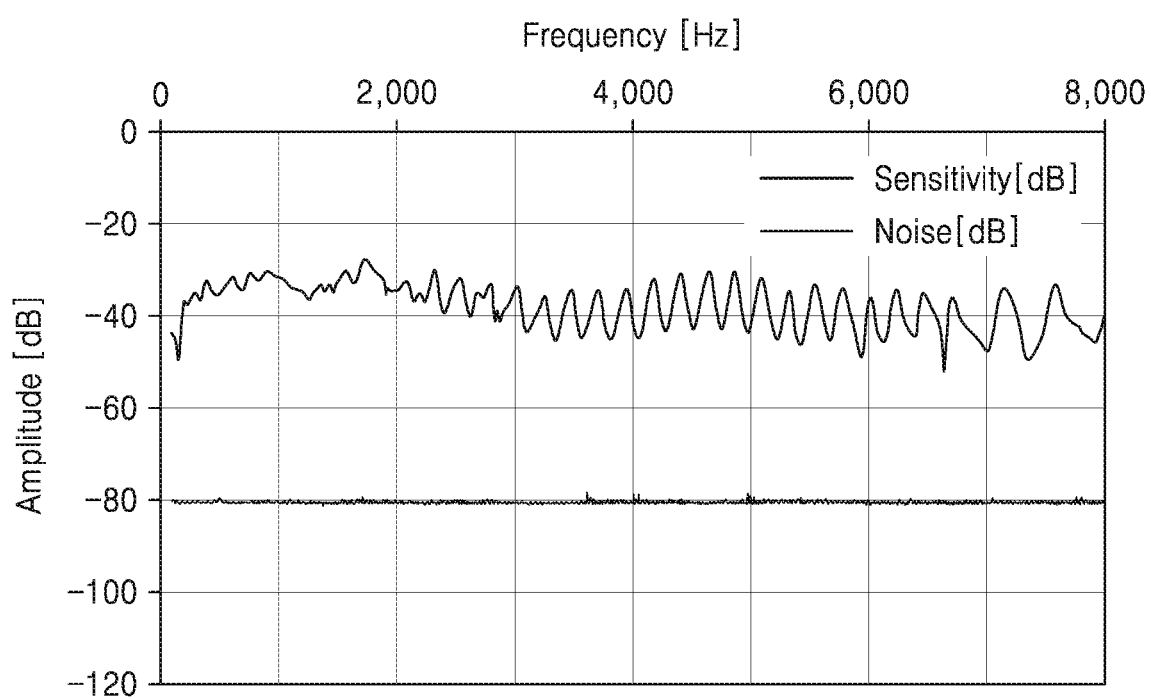
FIG. 3 illustrates an example of a result of detecting a frequency response characteristic of the directional acoustic sensor shown in FIG. 1.
Figure 4:
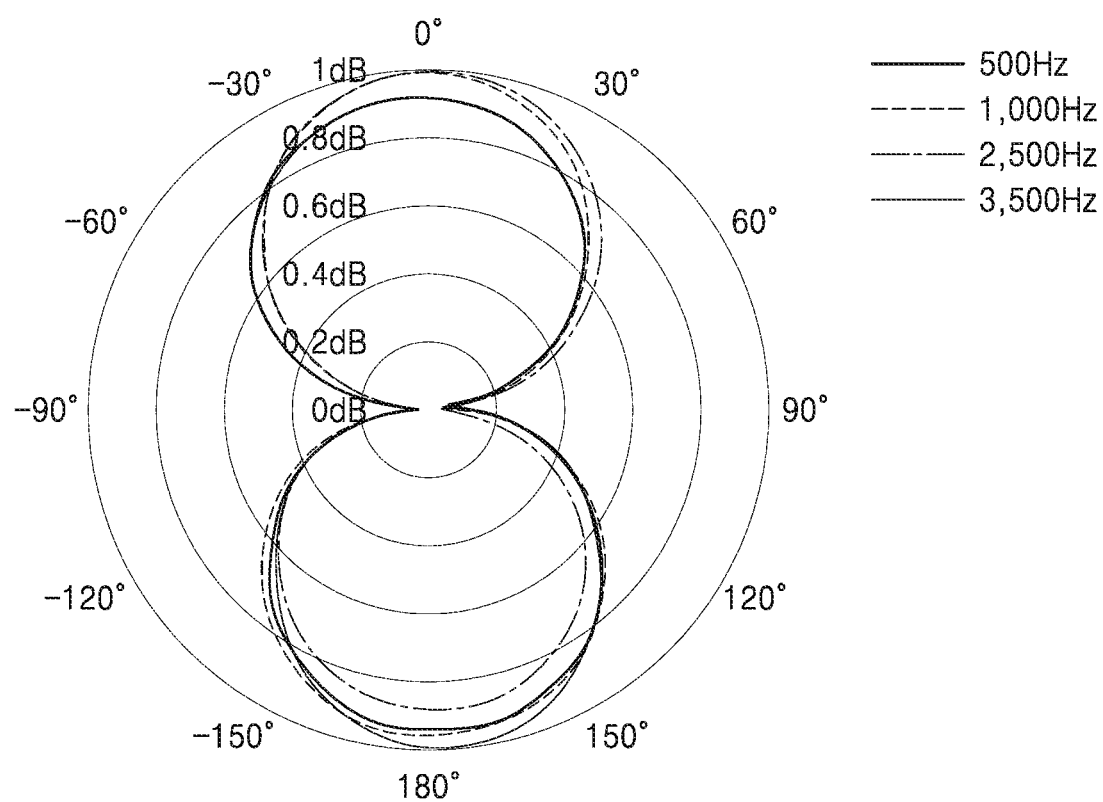
FIG. 4 illustrates an example of a result of detecting a directional characteristic of the directional acoustic sensor shown in FIG. 1.

FIG. 3 illustrates an example of a result of detecting a frequency response characteristic of the directional acoustic sensor 10 shown in FIG. 1. FIG. 4 illustrates an example of a result of detecting a directional characteristic of the directional acoustic sensor 10 shown in FIG. 1. As shown in FIG. 4, it may be seen that the directional acoustic sensor 10 has bi-directionality, that is, directionality in a z-axis direction, which is a direction of 0 degrees and a direction of 180 degrees. Although FIG. 1 illustrates a case where the plurality of resonators 12 are provided on the substrate 11, only one resonator 12 may be provided.

Figure 5:
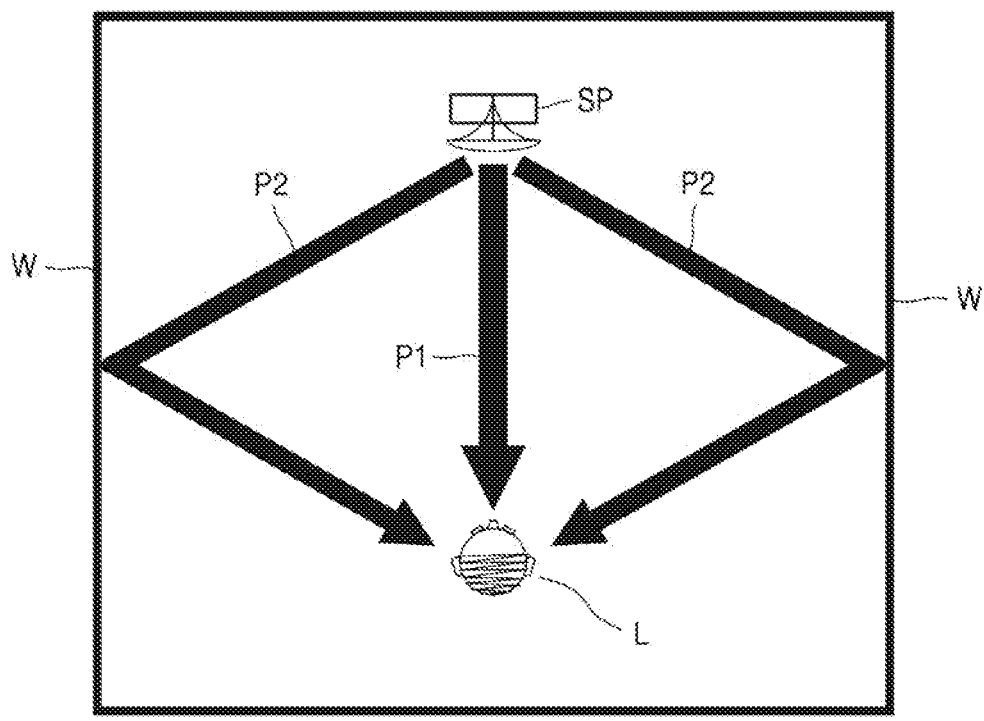
FIG. 5 illustrates an example of paths in which sound generated from a sound source provided inside a room reaches a listener.

FIG. 5 illustrates an example of paths P1 and P2 in which sound generated from a sound source SP provided inside a room reaches a listener L.

Referring to FIG. 5, the sound generated from the sound source SP may reach the listener L directly, but may be also reflected on wall surfaces W to reach the listener L. In FIG. 5, the first path P1 may represent a direct path through which the sound generated from the sound source SP directly reaches the listener L, and the second path P2 may represent a reflected path through which the sound generated from the sound source SP is reflected from the wall surfaces W to reach the listener L.

In the following embodiments, a directional sound sensor may be used to calculate a difference between a time taken for sound generated from a sound source to directly reach a listener and a time taken for the sound generated from the sound source to be reflected from a wall surface to reach the listener and detect a distance between the sound source and the directional sound sensor.

Figure 6:
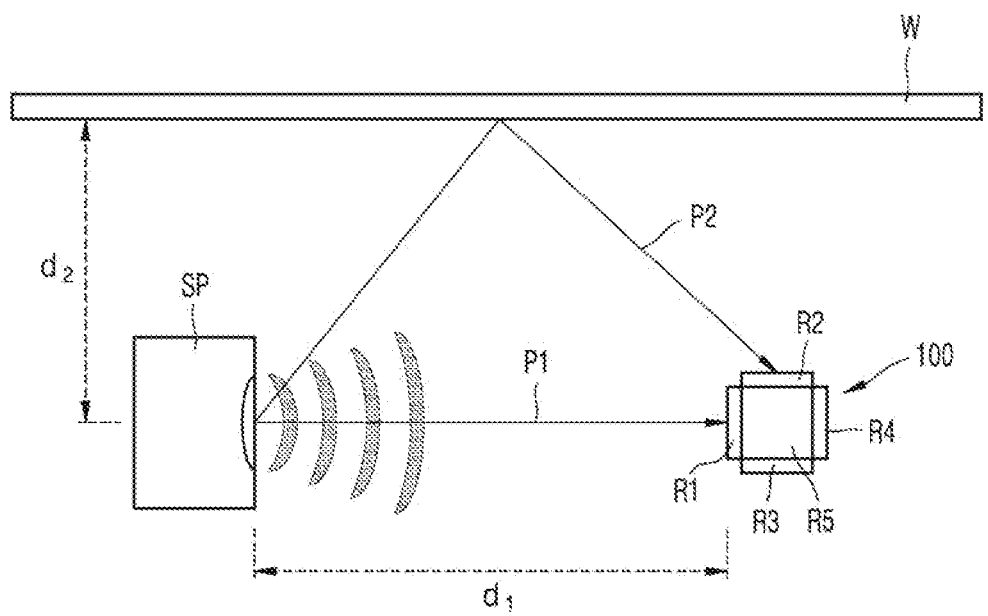
FIG. 6 schematically illustrates a directional acoustic sensor according to an embodiment.
Figure 7:
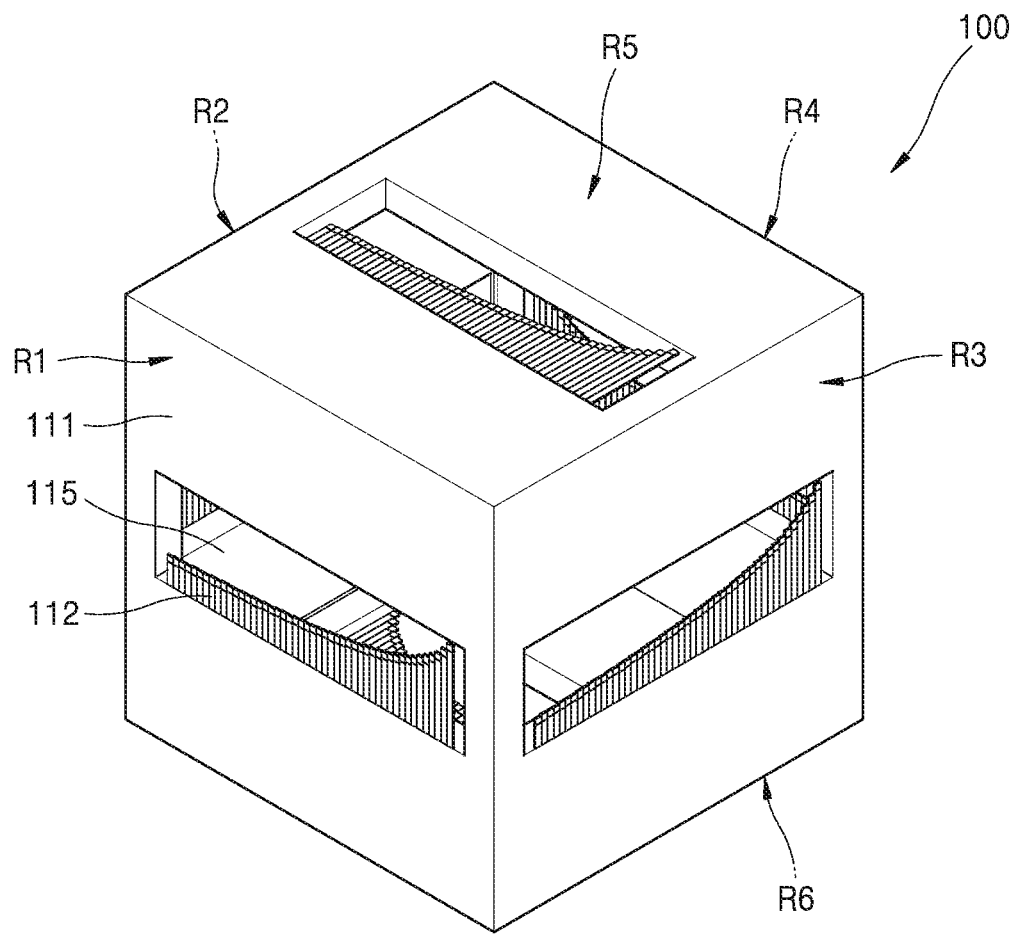
FIG. 7 is a perspective view of the directional acoustic sensor shown in FIG. 6.
Figure 8:
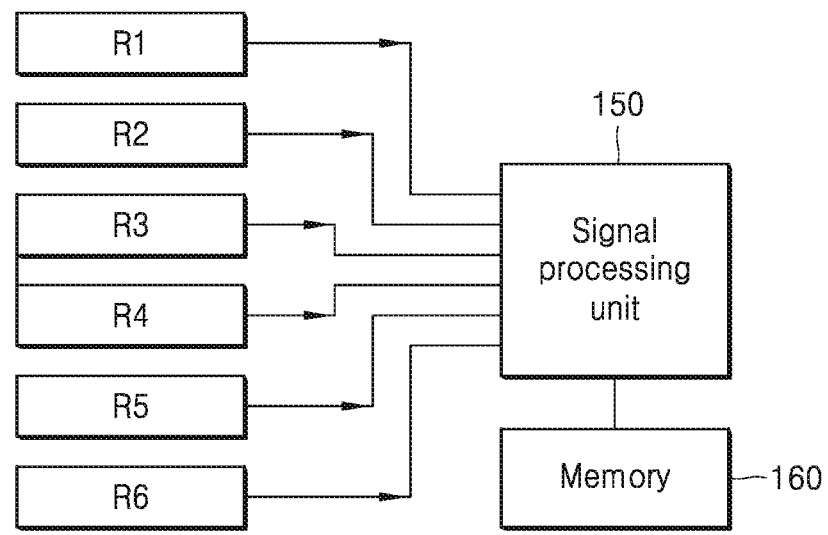
FIG. 8 is a block diagram showing a schematic configuration of the directional acoustic sensor shown in FIG. 6.
Figure 9A:
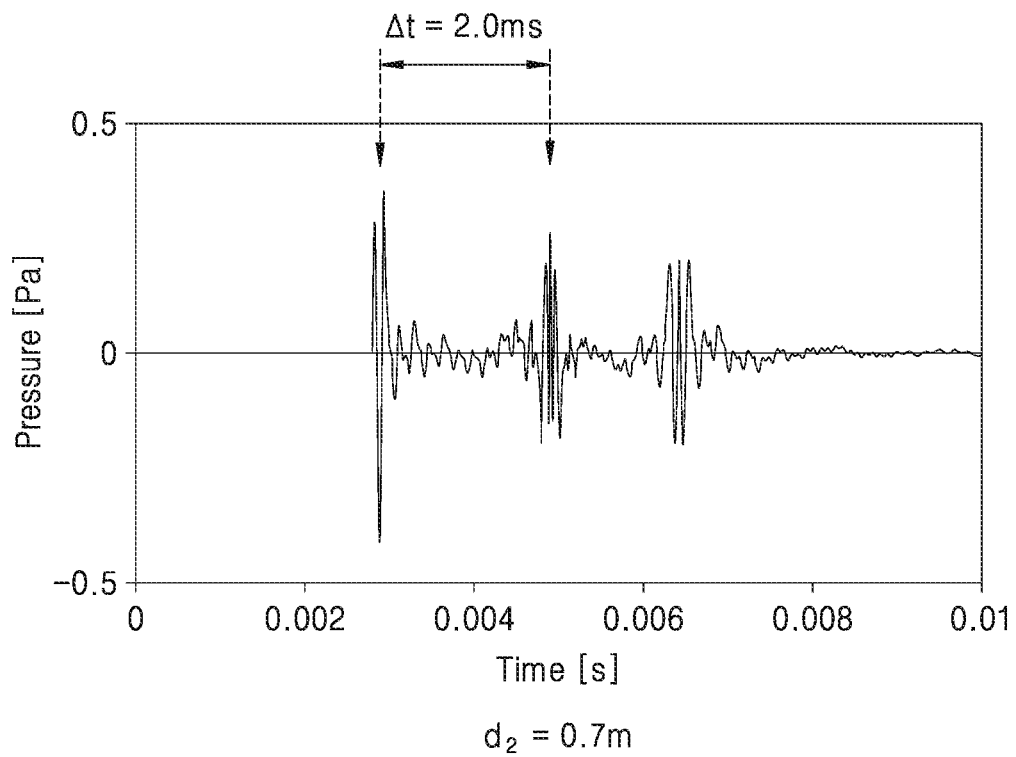
FIGS. 9A to 9F illustrate simulation results of waveforms of a first signal directly received by a first resonance unit and a second signal reflected from a wall surface and received by a second resonance unit according to a change in a distance between a sound source and the wall surface, in the directional acoustic sensor according to the embodiment shown in FIG. 6.
Figure 9B:
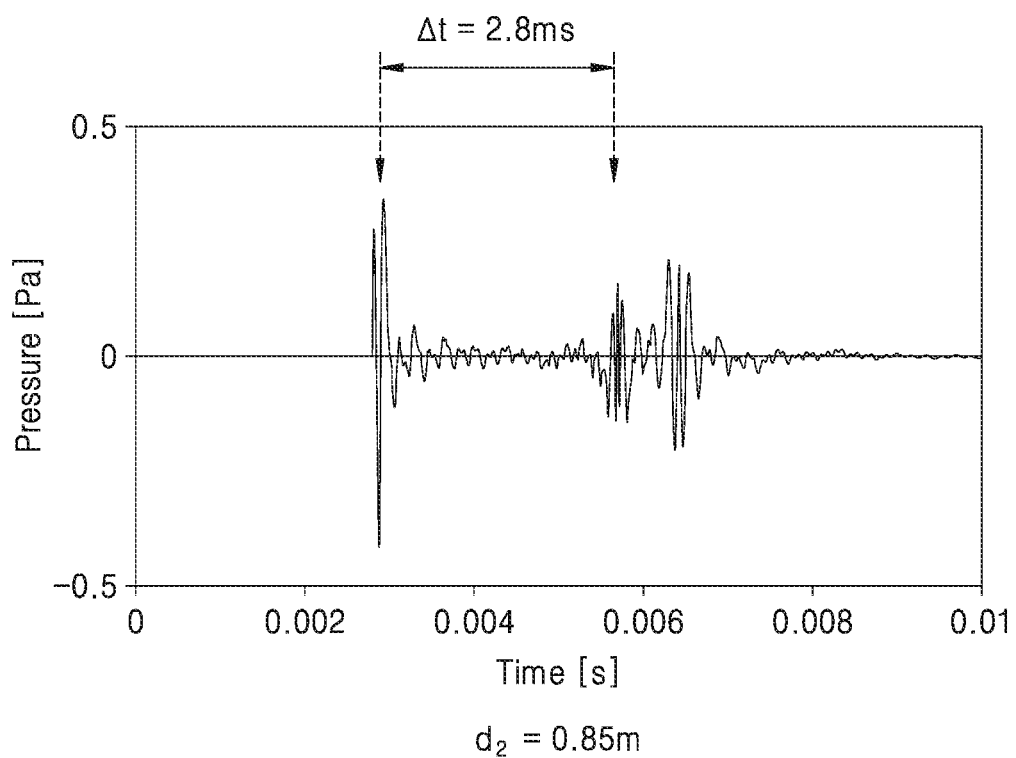
Figure 9C:
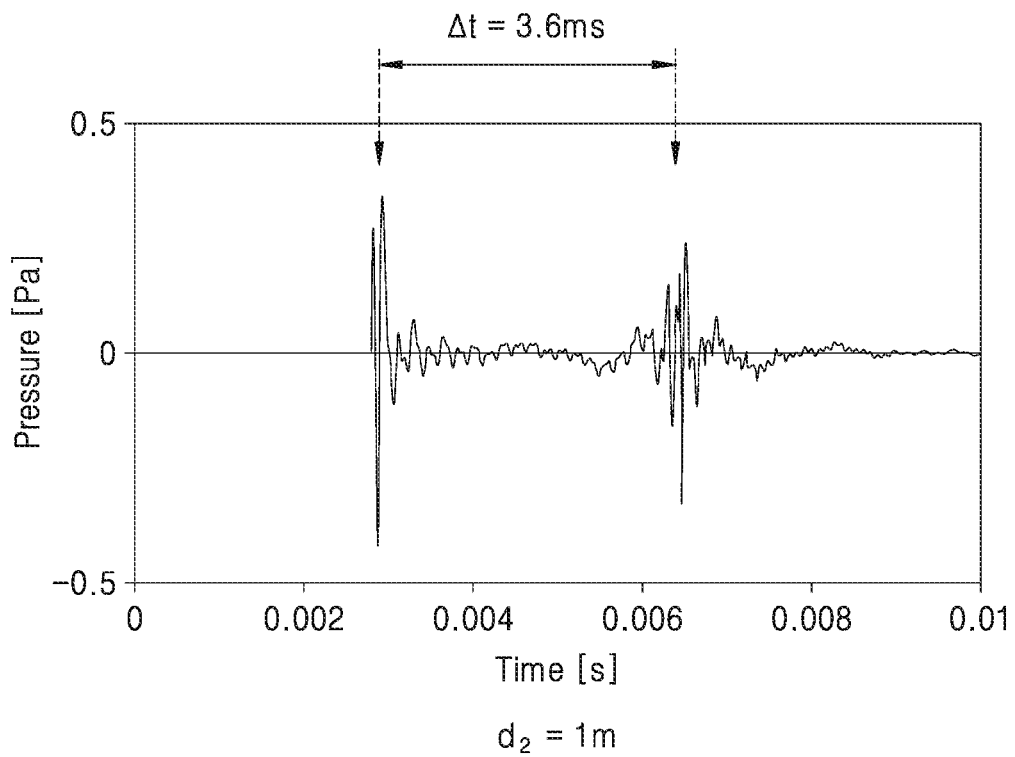
Figure 9D:
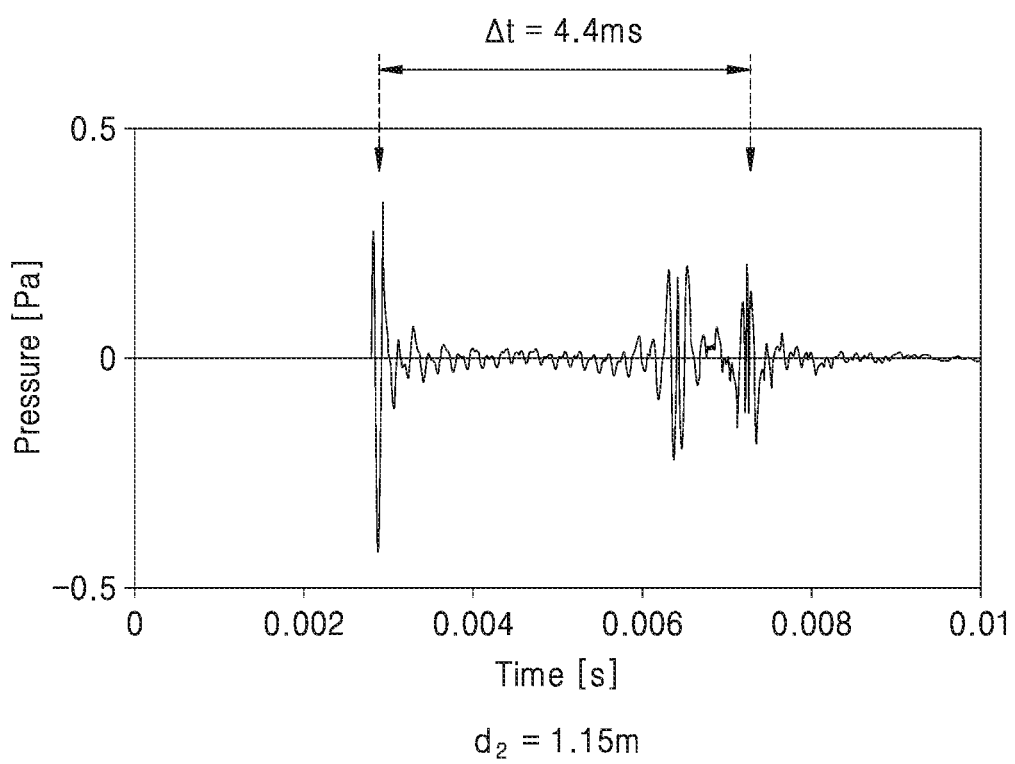
Figure 9E:
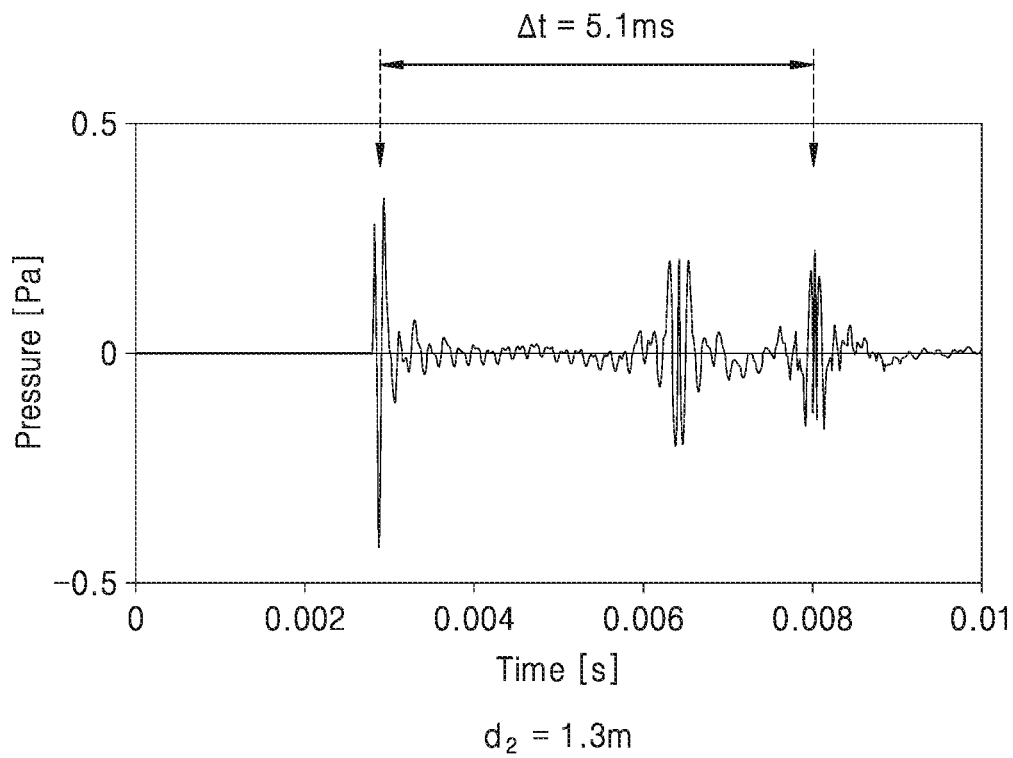
Figure 9F:
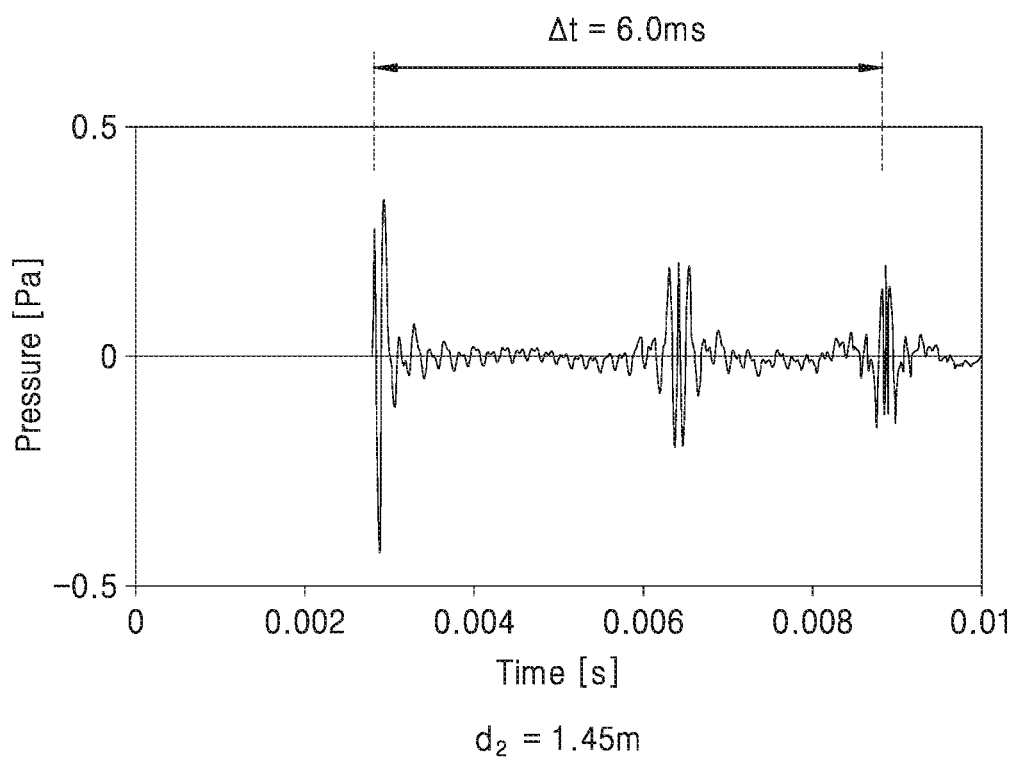

FIG. 6 schematically illustrates a directional acoustic sensor 100 according to an embodiment, and FIG. 7 is a perspective view of the directional acoustic sensor 100 shown in FIG. 6. FIG. 8 is a block diagram showing a schematic configuration of the directional acoustic sensor 100 shown in FIG. 6. FIG. 6 illustrates a case in which the directional acoustic sensor 100 is positioned in a front direction of the sound source SP and the wall surface W reflecting sound generated in the sound source SP is provided in one side direction of the sound source SP. Here, the directional acoustic sensor 100 may be placed at a position that allows a distance between the sound source SP and the wall surface W to be substantially the same as a distance between the directional acoustic sensor 100 and the wall surface W. In FIG. 6, a signal processing unit (e.g., a processor) 150 of FIG. 8 is not shown for the sake of convenience.

Referring to FIGS. 6 to 8, the directional acoustic sensor 100 according to an embodiment may include a plurality of resonance units R1 to R6 and the signal processing unit 150. Here, the plurality of resonance units R1 to R6 may be arranged in different directions.

FIG. 6 illustrates a case in which the six resonance units R1 to R6, that is, the first to sixth resonance units R1 to R6, are arranged at right angles to each other to form a cubic shape. However, the present disclosure is not limited thereto, and the number and arrangement of resonance units arranged in different directions may be variously modified.

Each of the first to sixth resonance units R1 to R6 may have the same configuration as the directional acoustic sensor 10 shown in FIG. 1 described above. Therefore, each of the first to sixth resonance units R1 to R6 may have directionality. As described above, each of the first to sixth resonance units R1 through R6 may include a substrate 111 with a cavity 115 penetrating therethrough and at least one resonator arranged on the cavity 115 of the substrate 111. Here, the six substrates 111 constituting the first to sixth resonance units R1 to R6 may be arranged at right angles to each other to form a cubic shape. At least one resonator 112 may have one end fixed to the substrate 111 and may extend toward the cavity 115.

Some of the first to sixth resonance units R1 to R6 may be arranged such that the sound generated from the sound source SP directly reaches and the others may be arranged such that the sound generated from the sound source SP is reflected from the wall surface W and reaches.

As a specific example, referring to FIG. 6, the first resonance unit R1 among the first to sixth resonance units R1 to R6 may be arranged to directly receive the sound generated from the sound source SP, and the second resonance unit R2 may be arranged to receive the sound generated from the sound source SP and reflected from the wall surfaces W. Accordingly, when the sound is generated from the sound source SP, the first resonance unit R1 may receive a first signal traveling along the first path P1, which is the direct path, and the second resonance unit R2 may receive a second signal traveling along the second path P2, which is a reflection path.

The signal processing unit 150 may process signals received by the resonance units R1 to R6 to calculate a time difference of the received signals and detect a distance $d_1$ between the sound source SP and the directional acoustic sensor 100 using the time difference. The signal processing unit 150 may store the signals received from the resonance units R1 to R6 in a memory 160 and may retrieve the signals from the memory 160 to determine the distance $d_1$ between the sound source SP and the directional acoustic sensor 100. Alternatively, the signal processing unit 150 may directly use the signals received from the resonance units R1 to R6.

As a specific example, referring to FIG. 6, the signal processing unit 150 may calculate a time difference of the first signal directly received by the first resonance unit R1 among the signals received by the resonance units R1 to R6 and the second signal reflected from the wall surface W around the sound source SP and received by the second resonance unit R2 and detect the distance $d_1$ between the sound source SP and the directional acoustic sensor 100 using the time difference between the first signal and the second signal.

First, the signal processing unit 150 may calculate the time difference between the first signal and the second signal. Here, the time difference between the first signal and the second signal may be determined by calculating a difference between a time taken for the sound generated from the sound source SP to directly reach the first resonance unit R1 and a time taken for the sound generated from the sound source SP to be reflected from the wall surface W to reach the second resonance unit R2.

Next, the signal processing unit 150 may determine the distance $d_1$ between the sound source SP and the directional acoustic sensor 100 by using the following Equation 1 using the time difference between the first signal and the second signal.

$$d_1 = \frac{2 \cdot d_2^2}{\Delta t \cdot v} - \frac{\Delta t \cdot v}{2} \quad (1)$$

Here, $\Delta t$ denotes the time difference between the first signal and the second signal and $d_2$ denotes the distance between the sound source SP and the wall surface W. v may be a sound speed of about 340 m/sec.

The distance $d_2$ between the sound source SP and the wall surface W in Equation 1 may be determined by measuring a time taken for sound generated by the directional acoustic sensor 100 to be reflected from the wall surface W and return. The distance $d_2$ may be stored in the memory 160. For example, when the directional acoustic sensor 100 according to an embodiment is employed in an electronic device such as an artificial Intelligence (AI) speaker, etc., a distance between the AI speaker and the wall surface W, that is, the distance $d_1$ between the sound source SP and the directional acoustic sensor 100, may be known by measuring a time taken for sound generated from the AI speaker at an initial setup of the AI speaker to be reflected from the wall surface W and return. Accordingly, the distance $d_2$ between the sound source SP and the wall surface W may be known in advance of determining the distance $d_1$ between the sound source SP and the directional acoustic sensor 100 based on Equation 1. The AI speaker may execute a voice command based on the distance between the sound source SP and the directional acoustic sensor 100.

As described above, the signal processing unit 150 may calculate the time difference $\Delta t$ between the first signal received by the first resonance unit R1 and the second signal received by the second resonance unit R2, and then detect the distance $d_1$ between the sound source SP and the directional acoustic sensor 100 using Equation 1 described above.

In the directional acoustic sensor 100 according to an embodiment, the plurality of resonance units R1 to R6 arranged in different directions may separate and receive signals in which the sound generated from the sound source SP travels in different directions (specifically, the direct path and the reflection path) and the signal processing unit 150 may detect the distance between the sound source SP and the directional acoustic sensor 100 using a time difference of the received signals.

Meanwhile, an example in which the resonance units R1 to R6 are arranged such that the first resonance unit R1 directly receives the sound generated from the sound source SP and the second resonance unit R2 receives the sound generated from the sound source SP and reflected from the wall surface W are arranged is described above. However, the present disclosure is not limited thereto, and the plurality of resonance units R1 to R6 may be arranged in various forms to separate and receive signals traveling in different paths.

FIGS. 9A to 9F and 10 illustrate simulation experimental results of the directional acoustic sensor 100 according to the embodiment shown in FIG. 6. Here, in a simulation experiment, the distance $d_2$ between the sound source SP and the wall surface W changes by moving the wall surface W while a distance between the sound source SP and the directional acoustic sensor 100 is fixed at 1 m.

FIGS. 9A to 9F illustrate simulation results of waveforms of a first signal directly received by the first resonance unit R1 and a second signal reflected from the wall surface W and received by the second resonance unit R2 according to a change in the distance $d_2$ between the sound source SP and the wall surface W, in the directional acoustic sensor 100 according to the embodiment shown in FIG. 6.

Referring to FIGS. 9A to 9F, when the distance $d_2$ between the sound source SP and the wall surface W is 0.7 m, 0.85 m, 1 m, 1.15 m, and 1.3 m, the time difference $\Delta t$ between the first signal and the second signal is detected as 2.0 ms, 2.8 ms, 3.6 ms, 4.4 ms, and 5.1 ms, respectively.

Figure 10:
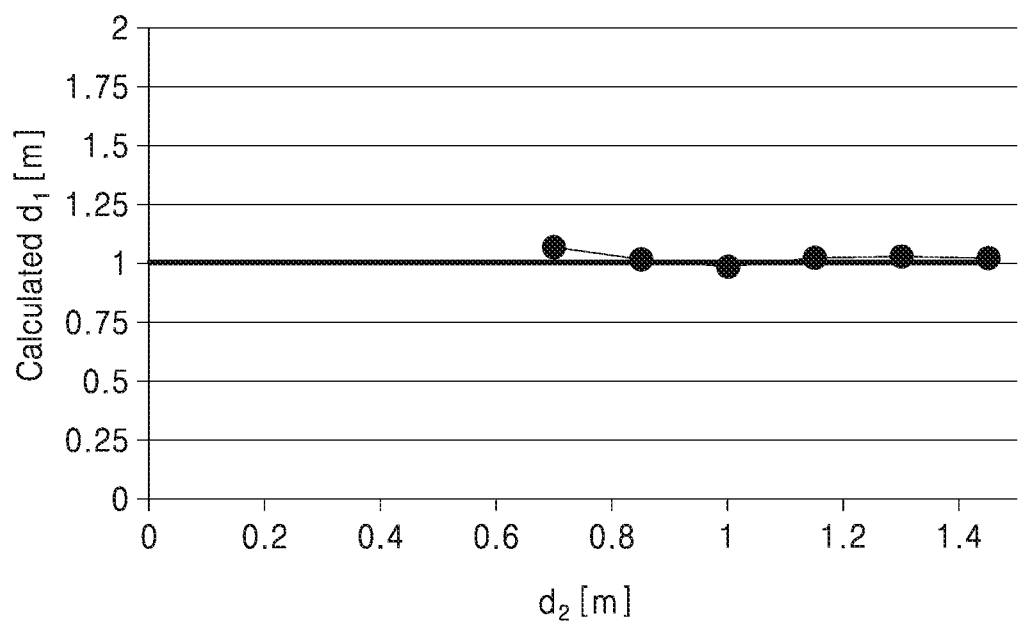
FIG. 10 illustrates distances between a sound source and a directional acoustic sensor calculated by using the results shown in FIGS. 9A to 9F.

FIG. 10 illustrates the distances $d_1$ between the sound source SP and the directional acoustic sensor 100 calculated by using detection results shown in FIGS. 9A to 9F. FIG. 10 illustrates results of calculating the distances $d_1$ between the sound source SP and the directional acoustic sensor 100 by applying the time difference $\Delta t$ between the first signal and the second signal shown in FIGS. 9A to 9F to Equation 1 described above. Referring to FIG. 10, the distance $d_1$ between the sound source SP and the directional acoustic sensor 100 calculated by using Equation 1 described above is detected with 1 m, which is an actual distance at an error within about 3%. Therefore, it may be seen that the distance $d_1$ between the sound source SP and the directional acoustic sensor 100 may be detected relatively and accurately.

Figure 11:
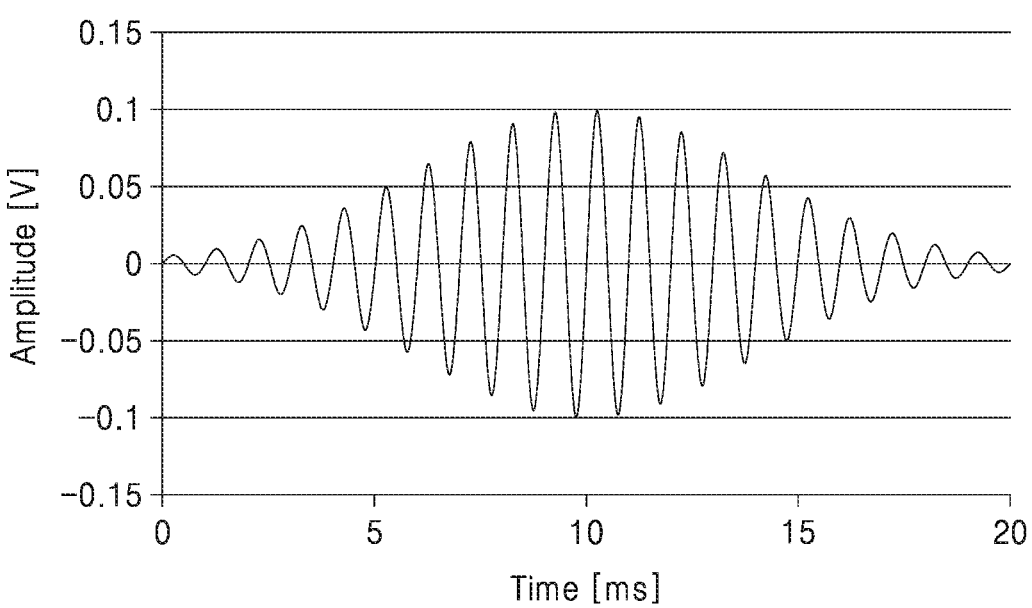
FIG. 11 illustrates a sound waveform of a sound source used for an experiment in the directional acoustic sensor according to the embodiment shown in FIG. 6.
Figure 12A:
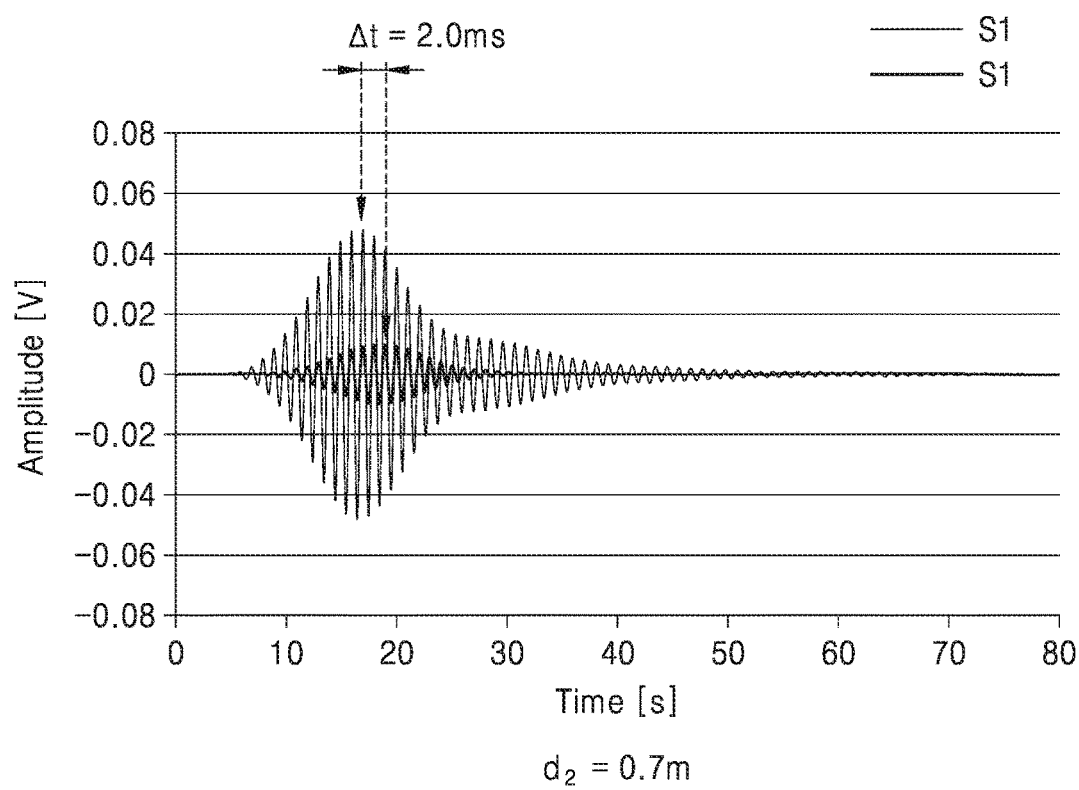
FIGS. 12A to 12E illustrate experimental results of waveforms of a first signal directly received by a first resonance unit and a second signal reflected from a wall surface and received by a second resonance unit according to a change in a distance between a sound source and the wall surface in the directional acoustic sensor according to the embodiment shown in FIG. 6.
Figure 12B:
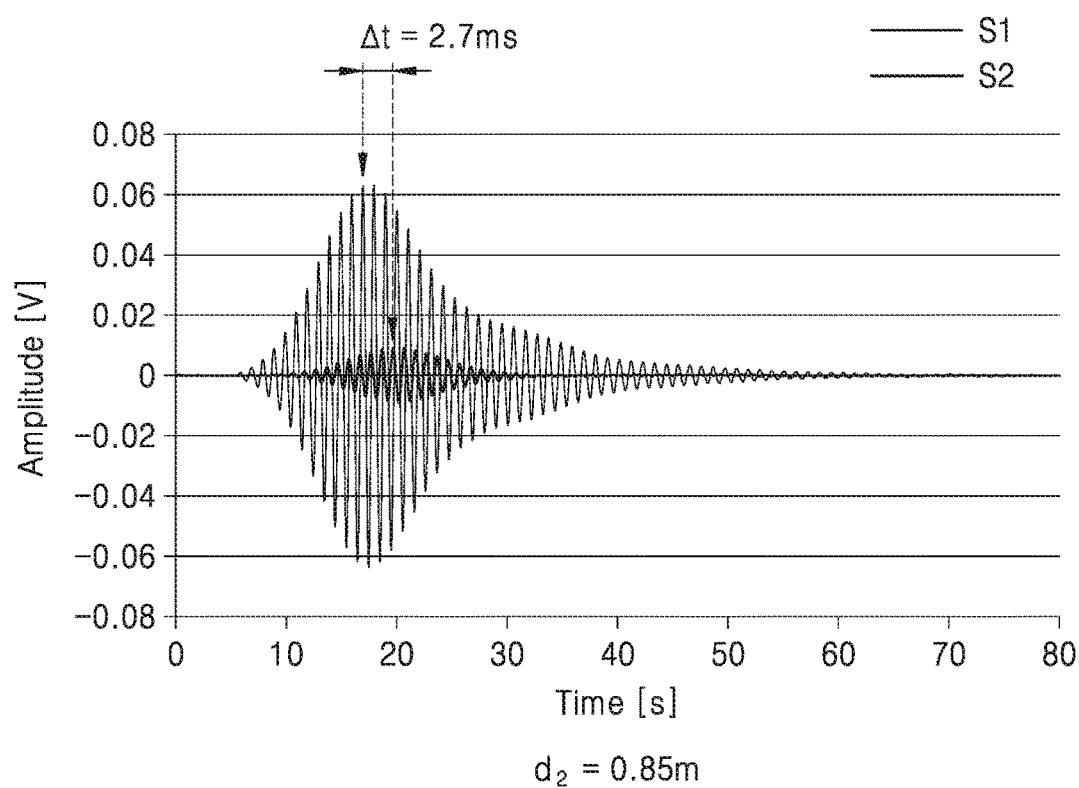
Figure 12C:
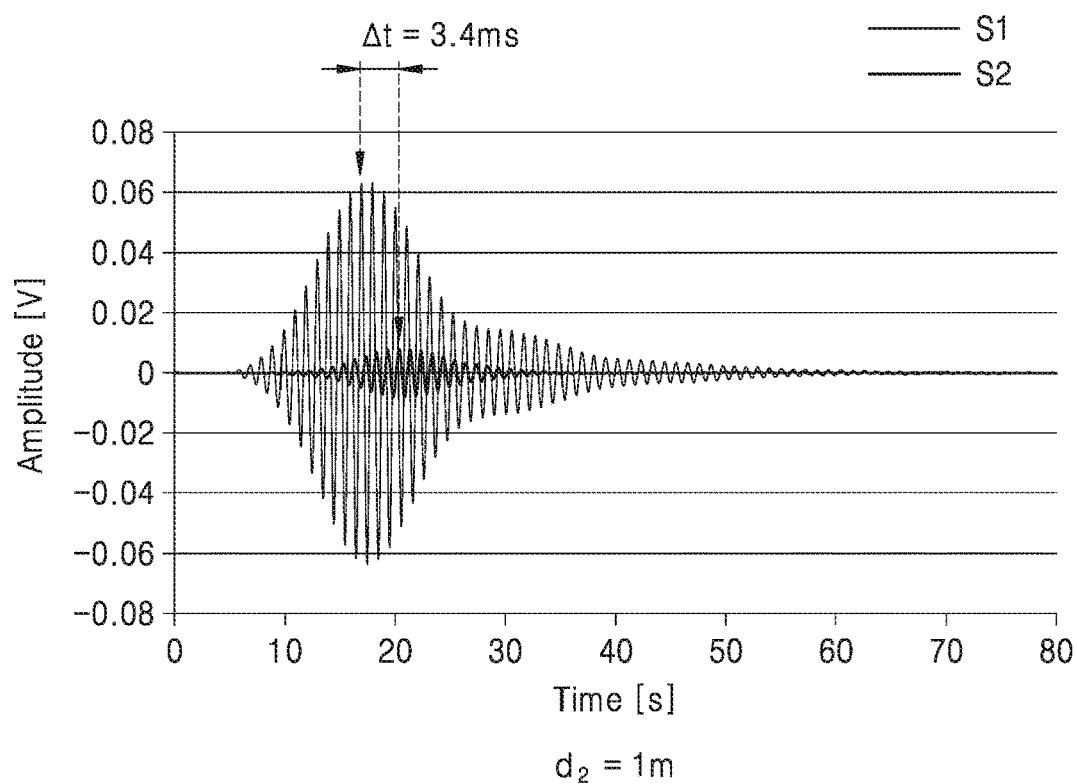
Figure 12D:
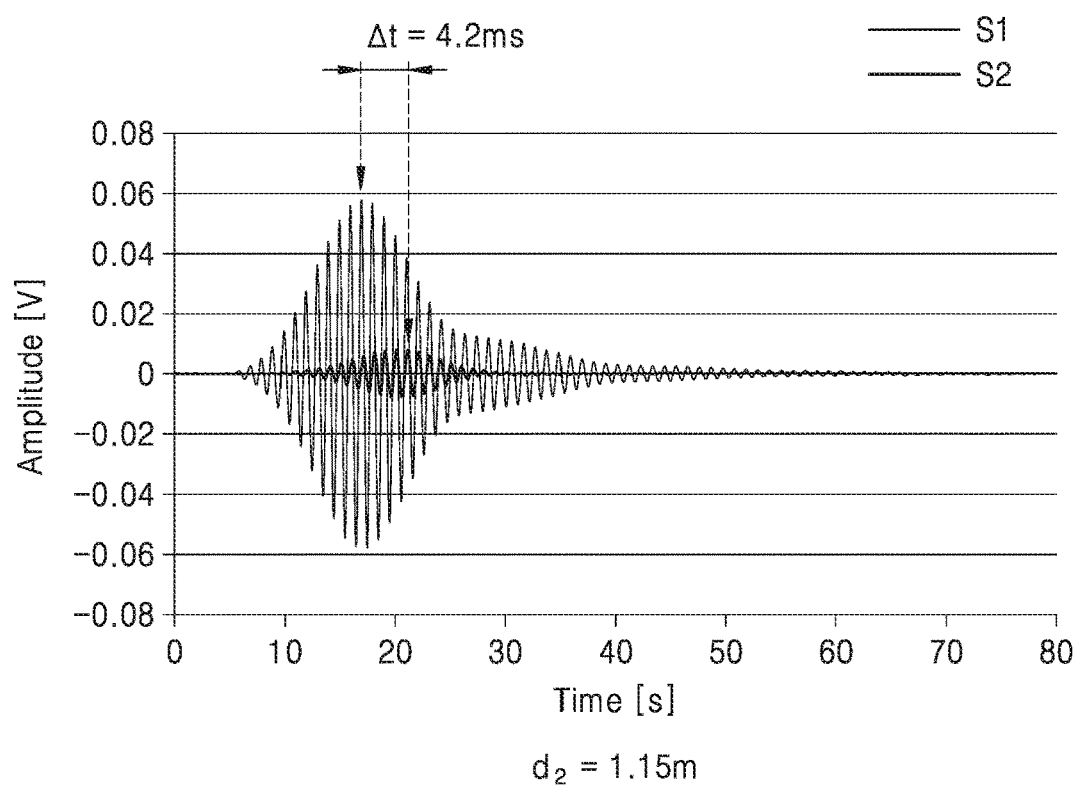
Figure 12E:
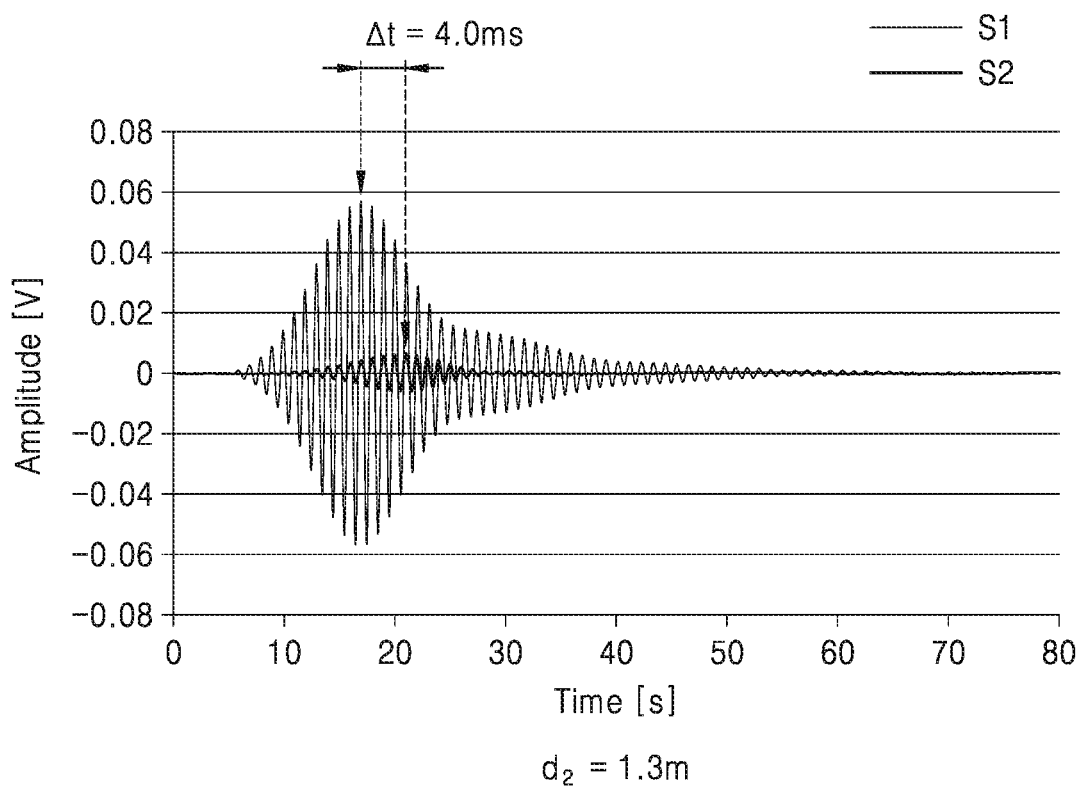
Figure 13:
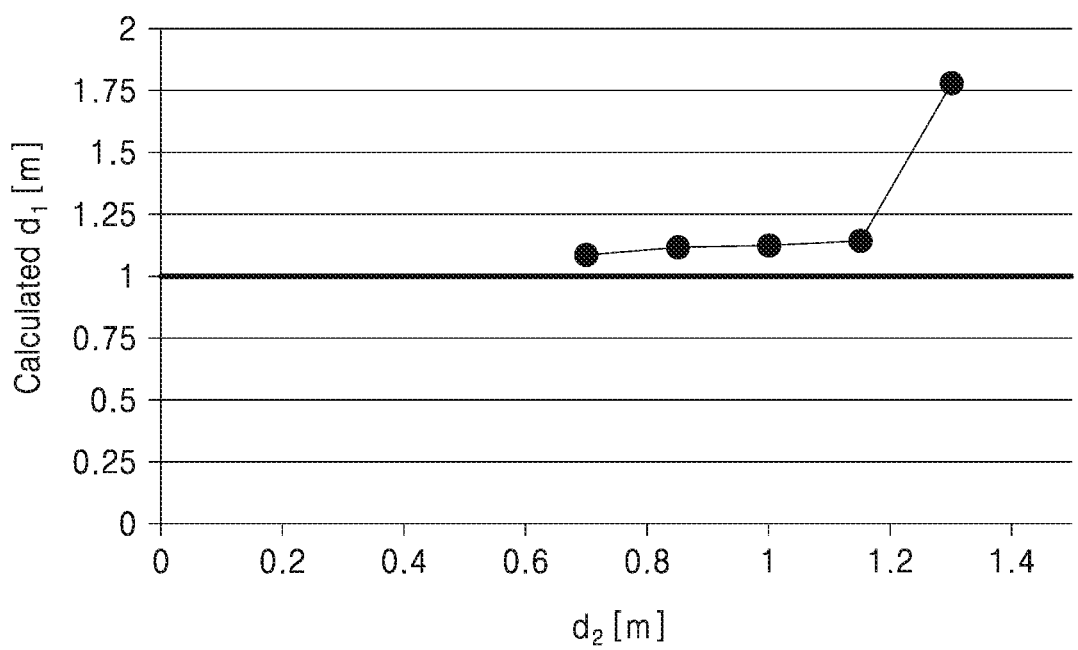
FIG. 13 illustrates the distances dl between a sound source and a directional acoustic sensor calculated by using results shown in FIGS. 12A to 12E.

FIGS. 11 to 13 show actual experimental results of the directional acoustic sensor 100 according to the embodiment shown in FIG. 6. Here, in an experiment, the distance $d_2$ between the sound source SP and the wall surface W changes by moving the wall surface W while a distance between the sound source SP and the directional acoustic sensor 100 is fixed at 1 m.

FIG. 11 illustrates a sound waveform of the sound source SP used for the experiment. FIGS. 12A to 12E illustrate experimental results of waveforms of a first signal S1 directly received by the first resonance unit R1 and a second signal S2 reflected from the wall surface W and received by the second resonance unit R2 according to a change in the distance $d_2$ between the sound source SP and the wall surface W when a sound waveform shown in FIG. 11 occurs in the sound source SP.

Referring to FIGS. 12A to 12E, when the distance $d_2$ between the sound source SP and the wall surface W is 0.7 m, 0.85 m, 1 m, 1.15 m, and 1.3 m, the time difference Δt between the first signal S1 and the second signal S2 is detected as 2.0 ms, 2.7 ms, 3.4 ms, 4.2 ms, and 4.0 ms, respectively.

FIG. 13 illustrates the distances dl between the sound source SP and the directional acoustic sensor 100 calculated by using detection results shown in FIGS. 12A to 12E. FIG. 13 illustrates results of calculating the distances $d_1$ between the sound source SP and the directional acoustic sensor 100 by applying the time difference Δt between the first signal S1 and the second signal S2 shown in FIGS. 12A to 12E to Equation 1 described above. Referring to FIG. 13, the distance $d_1$ between the sound source SP and the directional acoustic sensor 100 calculated by using Equation 1 described above is detected with 1 m, which is an actual distance at an error within about 10%. In FIG. 13, when the distance $d_2$ between the sound source SP and the wall surface W is greater than the distance $d_1$ between the sound source SP and the directional acoustic sensor 100, although there is a relatively great error in the calculation of the distance $d_1$ between the sound source SP and the directional acoustic sensor 100, this error is a result of an experiment using only one wall surface W. When all of the six resonance units R1 to R6 of the wall surface W and the directional acoustic sensors 100 are used, the distance $d_1$ between the sound source SP and the directional acoustic sensor 100 may be more accurately detected without a large error.

As described above, in the directional acoustic sensor 100 according to an embodiment, the plurality of resonance units R1 to R6 arranged in different directions may calculate a difference between a time taken for sound generated from the sound source SP to directly reach the directional acoustic sensor 100 and a time taken for the sound to be reflected from the wall surface W and directly reach the directional acoustic sensor 100 and accurately detect the distance between the sound source SP and the directional acoustic sensor 100 by using the calculated time difference.

Figure 14:
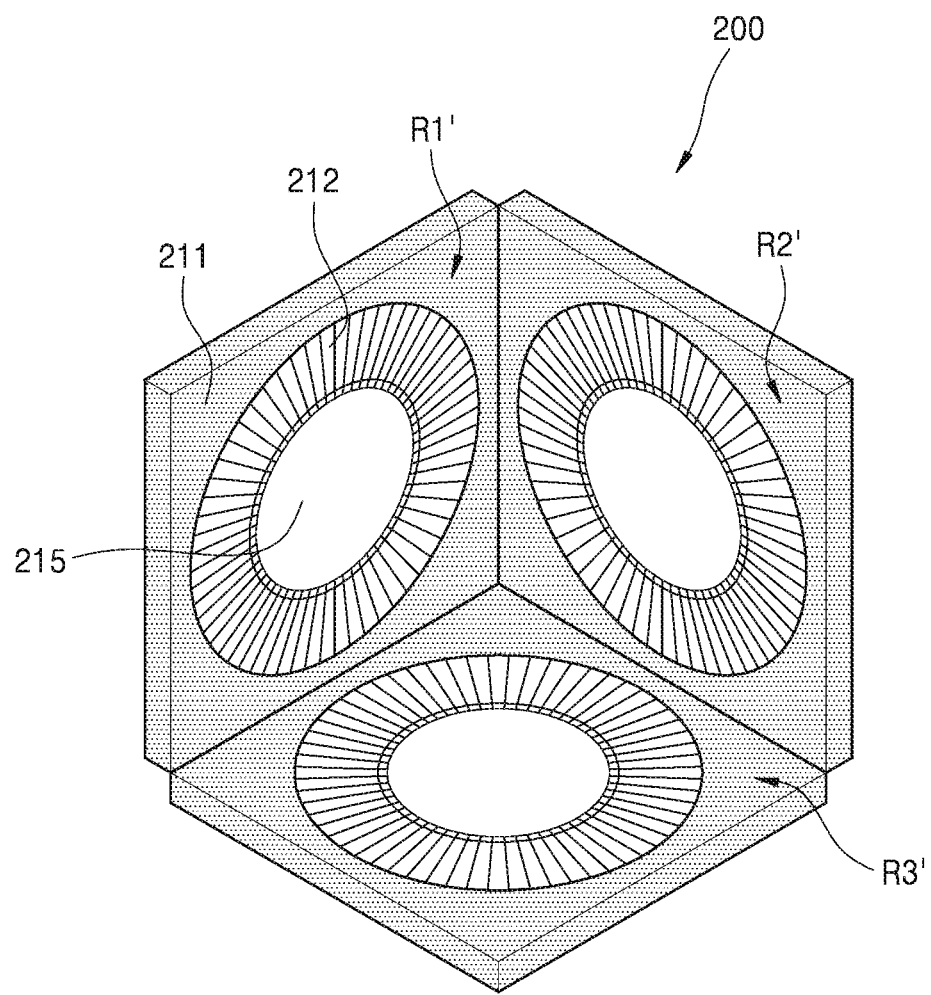
FIG. 14 schematically illustrates a directional acoustic sensor according to another embodiment.

FIG. 14 schematically illustrates a directional acoustic sensor 200 according to another embodiment.

Referring to FIG. 14, the directional acoustic sensor 200 may include three resonance units arranged in different directions, i.e., first, second and third resonance units R1', R2', and R3'. Here, each of the first, second and third resonance units R1', R2', and R3' may have directionality, and the first, second and third resonance units R1', R2', and R3' may be arranged obliquely with respect to each other at a predetermined angle. For example, the first, second and third resonance units R1', R2', and R3' may be disposed at right angles to each other, but are not limited thereto.

Each of the first, second and third resonance units R1', R2', and R3' may include a substrate 211 and a plurality of resonators 212. The substrate 211 may be formed with a cavity 215 in a circular shape penetrating therethrough, and the plurality of resonators 212 may be radially arranged on the cavity 115 of the substrate 211. Each of the resonators 212 may have one end fixed to the substrate 211 and extend toward the cavity 215. The resonators 212 may be provided to have, for example, different center frequencies. To this end, the resonators 212 may be provided to have different dimensions.

In the directional acoustic sensor 200 shown in FIG. 14, some of the first, second and third resonance units R1', R2', and R3' may directly receive sound generated from the sound source (SP in FIG. 6) and the others may receive the sound generated from the sound source SP and reflected from the wall surface (W in FIG. 6). A signal processing unit may calculate a time difference between sound that directly reaches the directional acoustic sensor 200 and sound that is reflected from the wall surface W and reaches the directional acoustic sensor 200 and detect a distance between the sound source SP and the directional acoustic sensor 200 by using the time difference. FIG. 14 illustrates an example in which a plurality of resonance units include the three resonance units R1', R2', and R3' arranged in different directions, but the present disclosure is not limited thereto, and the directional acoustic sensor 200 may also include various numbers of resonance units.

On the other hand, although the case where the directional acoustic sensor 100 or 200 includes the resonance units R1 to R6 shown in FIG. 7 or the resonance units R1', R2', and R3' shown in FIG. 14 is described above, this is merely an example, and a shape of each of resonance units constituting a directional acoustic sensor may be variously modified.

According to the directional acoustic sensors according to embodiments described above, a plurality of resonance units arranged in different directions may calculate a difference between a time taken for sound generated from a sound source to directly reach the directional acoustic sensor and a time taken for the sound to be reflected from a wall surface and directly reach the directional acoustic sensor and accurately detect a distance between the sound source and the directional acoustic sensor by using the calculated time difference.

The directional acoustic sensor according to an embodiment may be utilized in various electronic devices. For example, when the directional acoustic sensor according to an embodiment is employed in an AI speaker, the AI speaker may determine a location of a user, thereby performing a speech command of the user more accurately. For example, the directional acoustic sensor according to an embodiment may turn on light provided at the location of user or operate a surveillance camera or the like mainly at a place where sound is generated. Although the embodiments have been described above, the present disclosure is not limited thereto, and various modifications may be made by those skilled in the art.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A directional acoustic sensor comprising:
    a plurality of resonators arranged in different directions; and
    a processor configured to determine a time difference between a first signal that is received by the plurality of resonators directly from a sound source and a second signal that is received by the plurality of resonators from the sound source after being reflected on a wall surface around the sound source, and determine a distance between the sound source and the directional acoustic sensor based on the time difference, and a distance between the sound source and the wall surface.

2. The directional acoustic sensor of claim 1, wherein the plurality of resonators comprise a first resonator configured to receive the first signal and a second resonator configured to receive the second signal.

3. The directional acoustic sensor of claim 2, wherein the processor is further configured to determine the distance between the sound source and the directional acoustic sensor based on an equation below, $$d_1 = \frac{2 \cdot d_2^2}{\Delta t \cdot v} - \frac{\Delta t \cdot v}{2},$$

and
    wherein $d_1$ denotes the distance between the sound source and the directional acoustic sensor, $d_2$ denotes the distance between the sound source and the wall surface, $\Delta t$ denotes the time difference between the first signal and the second signal, and v denotes a speed of sound.

4. The directional acoustic sensor of claim 3, wherein the processor is further configured to determine the distance between the sound source and the wall surface based on a time taken for a sound generated by the directional acoustic sensor to be reflected from the wall surface and return to the directional acoustic sensor.

5. The directional acoustic sensor of claim 3, wherein the processor is further configured to determine the time difference between the first signal and the second signal based on a difference between a time taken for the first signal to reach the first resonator and a time taken for the second signal to reach the second resonator.

6. The directional acoustic sensor of claim 1, wherein the plurality of resonators comprise a plurality of substrates, each of the plurality of substrates having a cavity penetrating therethrough, and
    at least one cantilever beam is provided on each of the plurality of substrates.

7. The directional acoustic sensor of claim 6, wherein the plurality of substrates are arranged in different directions.

8. The directional acoustic sensor of claim 6, wherein the at least one cantilever beam comprises a plurality of cantilever beams arranged in parallel with one another or a plurality of cantilever beams arranged radially.

9. A method of detecting a distance between a sound source and a directional acoustic sensor using the directional acoustic sensor comprising a plurality of resonators arranged in different directions, the method comprising:
    determining a time difference between a first signal that is received by the plurality of resonators directly from the sound source and a second signal that is received by the plurality of resonators from the sound source after being reflected on a wall surface around the sound source, and
    determining the distance between the sound source and the directional acoustic sensor based on the time difference, and a distance between the sound source and the wall surface.

10. The method of claim 9, wherein the plurality of resonators comprise a first resonator configured to receive the first signal and a second resonator configured to receive the second signal.

11. The method of claim 10, wherein the determining the distance between the sound source and the directional acoustic sensor comprises determining the distance between the sound source and the directional acoustic sensor using an equation below, $$d_1 = \frac{2 \cdot d_2^2}{\Delta t \cdot v} - \frac{\Delta t \cdot v}{2},$$

and
    wherein $d_1$ denotes the distance between the sound source and the directional acoustic sensor, $d_2$ denotes the distance between the sound source and the wall surface, $\Delta t$ denotes the time difference between the first signal and the second signal, and v denotes a speed of sound.

12. The method of claim 11, wherein the determining the distance between the sound source and the directional acoustic sensor further comprises:
    determining the distance between the sound source and the wall surface by measuring a time taken for a sound generated by the directional acoustic sensor to be reflected from the wall surface and return to the directional acoustic sensor.

13. The method of claim 11, wherein the determining the distance between the sound source and the directional acoustic sensor further comprises:
    determining the time difference between the first signal and the second signal by measuring a difference between a time taken for the first signal to reach the first resonator and a time taken for the second signal to reach the second resonator.

14. The method of claim 9, wherein the plurality of resonators comprise a plurality of substrates each having a cavity penetrating therethrough, and
    at least one cantilever beam is provided on each of the plurality of substrates.

15. The method of claim 14, wherein the plurality of substrates are arranged in different directions.

16. The method of claim 14, wherein the at least one cantilever beam comprises a plurality of cantilever beams arranged in parallel with one another or a plurality of cantilever beams arranged radially.

17. A non-transitory computer-readable storage medium storing a program that is executable by a computer to perform a method of detecting a distance between a speaker and an acoustic sensor, the method comprising:
    determining a time difference between a first acoustic signal that travels in a direct path from the speaker to the acoustic sensor and a second acoustic signal that travels in an indirect path from the speaker to the acoustic sensor via a sound reflection surface;
    determining the distance between the speaker and the acoustic sensor based on the time difference, and a distance between the speaker and the sound reflection surface; and executing a voice command that is output from the speaker based on the distance between the speaker and the acoustic sensor.

18. The non-transitory computer-readable storage medium of claim 17, wherein the method further comprises causing a third acoustic signal to be emitted from the acoustic sensor toward the sound reflection surface and then collected by the acoustic sensor, and determining the distance between the speaker and the sound reflection surface based on the third acoustic signal collected by the acoustic sensor.

* * * * *